United States Patent
Sakurada et al.

(10) Patent No.: US 9,268,524 B2
(45) Date of Patent: Feb. 23, 2016

(54) INFORMATION PROCESSING APPARATUS, INFORMATION PROCESSING METHOD, AND COMPUTER READABLE MEDIUM

(75) Inventors: Akiko Sakurada, Tokyo (JP); Osamu Shigeta, Tokyo (JP); Nariaki Sato, Kanagawa (JP); Yasuyuki Koga, Kanagawa (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 251 days.

(21) Appl. No.: 13/545,615

(22) Filed: Jul. 10, 2012

(65) Prior Publication Data
US 2013/0021362 A1  Jan. 24, 2013

(30) Foreign Application Priority Data
Jul. 22, 2011 (JP) ................................. 2011-160592

(51) Int. Cl.
| | |
|---|---|
| *G09G 5/02* | (2006.01) |
| *G06F 3/041* | (2006.01) |
| *G06F 3/16* | (2006.01) |
| *G06F 3/038* | (2013.01) |
| *G10L 15/22* | (2006.01) |
| *G09G 5/00* | (2006.01) |

(52) U.S. Cl.
CPC ................ *G06F 3/167* (2013.01); *G06F 3/038* (2013.01); *G06F 3/0416* (2013.01); *G06F 2203/0381* (2013.01); *G09G 5/00* (2013.01); *G09G 2340/14* (2013.01); *G10L 2015/221* (2013.01)

(58) Field of Classification Search
CPC ........ G10L 15/00; G09G 5/02; G06F 3/0416; G06F 3/03547; G06F 3/0488; G06F 3/0481; G06F 3/048; G06F 3/017; G06F 3/041; G06F 1/1698; G06F 21/32; G06F 3/0346; G06F 17/275; H04M 1/0202; H04M 3/567
USPC .................................. 345/589; 704/E15.001
See application file for complete search history.

(56) References Cited

U.S. PATENT DOCUMENTS

| | | | |
|---|---|---|---|
| 2005/0120046 A1 | 6/2005 | Nakagawa et al. | |
| 2007/0274296 A1* | 11/2007 | Cross et al. ................... | 370/356 |
| 2007/0293313 A1* | 12/2007 | Shimizu et al. ................ | 463/31 |
| 2008/0030463 A1* | 2/2008 | Forest .......................... | 345/156 |
| 2008/0204427 A1* | 8/2008 | Heesemans et al. .......... | 345/174 |
| 2012/0113228 A1* | 5/2012 | Konno et al. .................. | 348/47 |
| 2012/0231839 A1* | 9/2012 | Seo et al. .................. | 455/556.1 |
| 2013/0328770 A1* | 12/2013 | Parham ........................ | 345/157 |

FOREIGN PATENT DOCUMENTS

| | | |
|---|---|---|
| JP | 2003-345390 A | 12/2003 |
| JP | 2004-265217 A | 9/2004 |

(Continued)

OTHER PUBLICATIONS

Japanese Office Action issued Apr. 21, 2015 in Patent Application No. 2011-160592 (without English translation).

*Primary Examiner* — Kee M Tung
*Assistant Examiner* — Yuehan Wang
(74) *Attorney, Agent, or Firm* — Oblon, McClelland, Maier & Neustadt, L.L.P.

(57) ABSTRACT

An apparatus includes an input unit, a microphone, a control unit, and a voice recognition unit. The input unit is configured to receive a first type input and a second type input. The microphone is configured to receive an input sound signal. The control unit is configured to control a display to display feedback according to a type of input. The voice recognition unit is configured to perform recognition processing on the input sound signal.

18 Claims, 12 Drawing Sheets

(56) References Cited

FOREIGN PATENT DOCUMENTS

| JP | 2005-164944 A | 6/2005 |
| JP | 2007-58782 A | 3/2007 |
| JP | 2009-25579 A | 2/2009 |
| JP | 2010-217754 | 9/2010 |
| JP | 2011-118822 A | 6/2011 |

* cited by examiner

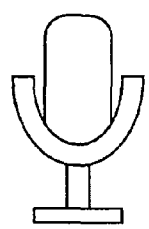 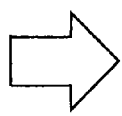 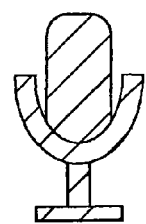 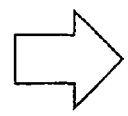 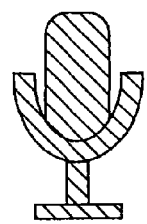
FIG.5A  FIG.5B  FIG.5C
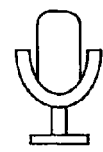 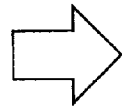 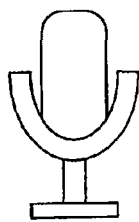 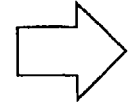 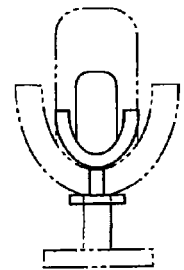
FIG.6A  FIG.6B  FIG.6C

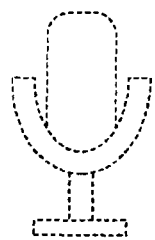 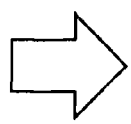 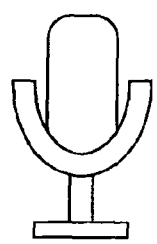 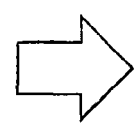 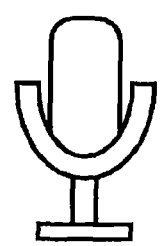
FIG.7A　　　　　FIG.7B　　　　　FIG.7C
 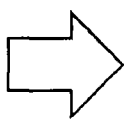 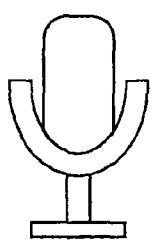 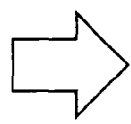 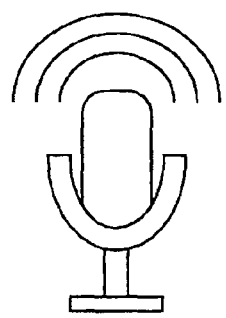
FIG.8A　　　　　FIG.8B　　　　　FIG.8C

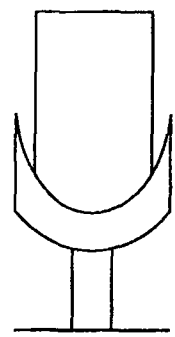 
FIG.13A  FIG.13B
 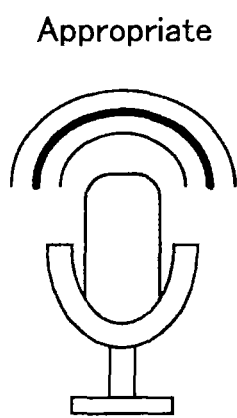 
FIG.14A  FIG.14B  FIG.14C

INFORMATION PROCESSING APPARATUS, INFORMATION PROCESSING METHOD, AND COMPUTER READABLE MEDIUM

CROSS-REFERENCE TO RELATED APPLICATIONS

The present application is based upon and claims the benefit of priority under 35 U.S.C. §119 of Japanese Priority Patent Application JP 2011-160592 filed in the Japanese Patent Office on Jul. 22, 2011, the entire contents of which are hereby incorporated by reference.

BACKGROUND

The present technology relates to an information processing apparatus capable of performing processing corresponding to an input of voice, an information processing method in the information processing apparatus, and a program encoded on a non-transitory computer readable medium.

There is an information processing apparatus capable of detecting and recognizing voice (voice of a user) and performing processing corresponding thereto. For example, Japanese Patent Application Laid-open No. 2010-217754 describes a voice input apparatus that includes an angle sensor measuring an angle of the voice input apparatus and a distance sensor measuring a distance to a user so as to perform on-off control of a voice input section based on the measured angle and distance. This voice input apparatus enters a voice input mode when detecting that the apparatus is near the user's mouth.

SUMMARY

The technology described in the above-mentioned publication No. 2010-217754 does not give the user any information, as a feedback, about whether the voice input mode is in ready condition. No one can say that such apparatus is easy to handle because the user cannot hope to notice whether the voice input mode is ready without checking execution of the processing by actually inputting voice and performing processing corresponding thereto.

In view of the above-mentioned circumstances, it is desirable to provide an information processing apparatus capable of informing a user of that the voice input mode is ready without fail, an information processing method and a program encoded on a computer readable medium.

In one embodiment, the invention includes an apparatus including an input unit, a microphone, a control unit, and a voice recognition unit. The input unit is configured to receive a first type input and a second type input. The microphone is configured to receive an input sound signal. The control unit is configured to control a display to display feedback according to a type of input. The voice recognition unit is configured to perform recognition processing on the input sound signal.

According to another embodiment of the present technology, there is provided an information processing apparatus including a state detection section, a touch sensor, a microphone, and a control section. The state detection section is configured to be capable of detecting a first state change of the information processing apparatus. The touch sensor is configured to be capable of detecting a touch by a user. The microphone is configured to be capable of converting voice of the user input thereto into a voice signal. The control section is configured to be capable of performing a voice input mode in which the voice signal is recognized as textual data. Further, the control section is configured to be capable of generating a first command to output a first image indicating that the voice input mode is in a state of being prepared when the first state change is detected. Furthermore, the control section is configured to be capable of generating a second command to output a second image indicating that the voice input mode is in ready condition when the touch is detected after the first state change has been detected.

Thus, the information processing apparatus informs the user of that the voice input mode is ready without fail because of 2-step visual feedback using the first image and the second image. Here, the first state change may contain detection of an angle of an enclosure of the information processing apparatus, detection of a button pressing on the information processing apparatus, detection of a predetermined pattern of touching, and detection of any other event related to the first state around the information processing apparatus. Following the first command and the second command, the first image and the second image may be presented by the information processing apparatus or an external apparatus.

The information processing apparatus may further include a communication section configured to be capable of transmitting the first command and the second command to an external display apparatus.

Thus, the information processing apparatus provides to a user improved visual recognition of the visual feedback of the event that the voice input mode is ready by causing the external display apparatus to present the first image and the second image.

The information processing apparatus may further include an enclosure. In this case, the state detection section may include an angle sensor configured to be capable of detecting an angle of the enclosure, and the control section may be configured to be capable of generating the first command when it is detected that the angle of the enclosure falls in a predetermined angular range.

Thus, preparation for the voice input mode is commenced when a user tilts the enclosure to the predetermined angular range, and the information processing apparatus permits visual feedback of this preparation to the user. The predetermined angular range is set so that the central angle of the range is an angle formed between the front of the enclosure and the ground when the front of the enclosure is approximately vertical.

The second image may be an image resulting from modifying a portion of the first image.

Thus, the information processing apparatus allows the second image to have relevance to the first image. This makes it easy for the user to grasp the change from the voice input mode in a state being prepared to the voice input mode in ready condition. What is intended by "modifying a portion" here encompasses, for example, modifying a color or luminance of a predetermined area between the first image and the second image and modifying a position or form of a predetermined object between the first image and the second image, but it is not limited by these examples.

The control section may be configured to be capable of generating a third command to output a third image in place of the second image when, with the second image being output, the voice of the user is input to the microphone.

Thus, the information processing apparatus informs the user of the entry of the voice by further visual feedback.

The control section may be configured to terminate the voice input mode when the touch of the user ceases to be detected.

This permits the user to terminate the voice input mode by very simple and easy operation of only releasing the touch.

The state detection section may be configured to be capable of detecting a second state change of the information processing apparatus. In this case, the control section may be configured to suspend recognition of the voice signal when the second state change is detected while the voice signal is being recognized.

Thus, the information processing apparatus may cancel processing of the voice signal when the second state change is detected even while the voice signal is being recognized. What is intended by "the second state change" here encompasses, for example, detection of a flick input operation by the user on a touch panel of the information processing apparatus, detection of a shaking operation by the user to shake an enclosure of the information processing apparatus, and detection of entry of predetermined voice of the user, but it is not limited by these examples.

The information processing apparatus may further include a communication section configured to be capable of communicating with a search engine on a network. In this case, the control section may be configured to generate a command to output a recognized result image containing the recognized textual data. Further, the control section may be configured to transmit a search query requesting search processing using the recognized textual data as keywords to the search engine.

Thus, the information processing apparatus causes the user to comprehend the recognized textual data and causes the search engine to carry out the search in accordance with the search query using the textual data as keywords.

The state detection section may be configured to be capable of detecting a second state change of the information processing apparatus, and the recognized result image may include a first area for presentation of the recognized textual data and a second area different from the first area. In this case, the control section may be configured to present, upon recognition of first textual data, the first textual data in the first area, and to move the first textual data from the first area to the second area when the second state change is detected within a predetermined period of time after the recognition of the first textual data. Further, the control section may be configured to present, upon recognition of second textual data after the detection of the second state change, the second textual data in the first area, and to transmit, upon failing to detect the second state change within the predetermined period of time after the recognition of the second textual data, a search query requesting search processing using the first textual data and the second textual data as keywords.

Thus, the information processing apparatus causes the user to easily comprehend that the first textual data are stored on stack by presentation of the first textual data on the second area when the second state change exists, and causes the search engine to carry out so-called AND search processing based on the first textual data and the subsequently recognized second textual data. What is intended by "the second state change" here encompasses, for example, shaking (reciprocating movement) of an enclosure of the information processing apparatus and detection of a flick operation of the user by a touch sensor, but it is not limited by these examples.

The touch sensor may include a plurality touch areas which are assigned different functions in a mode other than the voice input mode. In this case, the control section may be configured to disable the functions assigned to the plurality of touch areas when the voice input mode is in state of being prepared and in ready condition.

Thus, the information processing apparatus prevents operational error by the user in the voice input mode by causing the touch operation by the user to serve only as a command to execute the voice input mode.

The touch sensor may be configured to be capable of detecting touches to a plurality of points at the same time. In this case, the control section may be configured to fail to generate the first command even when the first state change is detected while the touches to the plurality of points are being detected.

Thus, the information processing apparatus restricts execution of the voice input mode when the user operates the information processing apparatus with multi-touch for a particular purpose, for example, game, text entry or any other purpose using such multi-touch.

The display apparatus may be configured to be capable of outputting sound. In this case, the control section may be configured to generate a volume command to turn down a volume of the sound output by the display apparatus, and to cause the communication section to transmit the volume command.

Thus, the information processing apparatus provides improved accuracy of the voice recognition in the voice input mode by complete removal of the influence of the sound output from the display apparatus.

The control section may be configured to generate a command to output an image indicating that an input level of the voice input to the microphone is less than or equal to a first value, and to generate a command to output an image indicating that the input level of the voice input to the microphone is greater than a second value.

Thus, the information processing apparatus provides improved accuracy of voice recognition by adjusting a distance between the information processing apparatus and the user's mouth in accordance with an input level of the voice of the user.

According to another embodiment of the present technology, there is provided an information processing apparatus including a display section, a communication section, and a control section. The communication section is configured to be capable of receiving, from a mobile device handheld by a user, state information indicating that a predetermined state change of the mobile device is detected and touch information indicating that a touch by the user is detected by a touch sensor of the mobile device. The control section is configured to be capable of controlling the display section such that display presents a first image indicating that a voice input mode executable by the mobile device is in a state of being prepared when the sate information is received. Further, the control section is configured to be capable of controlling the display section such that display presents a second image indicating that the voice input mode is in ready condition when the touch information is received after the state information has been received.

According to another embodiment of the present technology, there is provided an information processing method for an information processing apparatus, the method including detecting a predetermined state change of the information processing apparatus. A first command to output a first image indicating that a voice input mode, in which a voice signal given by converting voice of a user is recognized as textual data, is in a state of being prepared is generated when the predetermined state change is detected. A touch by the user is detected after the predetermined state change has been detected. A second command to output a second image indicating that the voice input mode is in ready condition is generated when the touch by the user is detected.

According to another embodiment of the present technology, there is provided a program encoded on a non-transitory computer readable medium that causes an information processing apparatus to perform the steps of: detecting a predetermined state change of the information processing apparatus; generating a first command to output a first image indicating that a voice input mode, in which a voice signal given by converting voice of a user is recognized as textual data, is in a state of being prepared when the predetermined state change is detected; detecting a touch by the user after the predetermined state change has been detected; and generating a second command to output a second image indicating that the voice input mode is in ready condition when the touch by the user is detected.

As described above, the present technology informs the user without fail of that the voice input mode is in ready condition.

BRIEF DESCRIPTION OF DRAWINGS

FIGS. 5A to 5C are schematic diagrams illustrating one example of images including an image indicating that a voice input mode is in a state of being prepared and an image indicating that the voice input mode is in a state of being in ready condition;

FIGS. 6A to 6C are schematic diagrams illustrating another example of images including an image indicating that a voice input mode is in a state of being prepared and an image indicating that the voice input mode is in a state of being in ready condition;

FIGS. 7A to 7C are schematic diagrams illustrating still another example of images including an image indicating that a voice input mode is in a state of being prepared and an image indicating that the voice input mode is in a state of being in ready condition;

FIGS. 8A to 8C are schematic diagrams illustrating still another example of images including an image indicating that a voice input mode is in a state of being prepared and an image indicating that the voice input mode is in a state of being in ready condition;

FIGS. 13A and 13B illustrate one example of display for informing, in the voice input mode, the user of loudness of voice input by means of an icon;

FIGS. 14A to 14C illustrate another example of display for informing, in the voice input mode, the user of loudness of voice input by means of an icon;

DETAILED DESCRIPTION OF EMBODIMENTS

Figure 1:
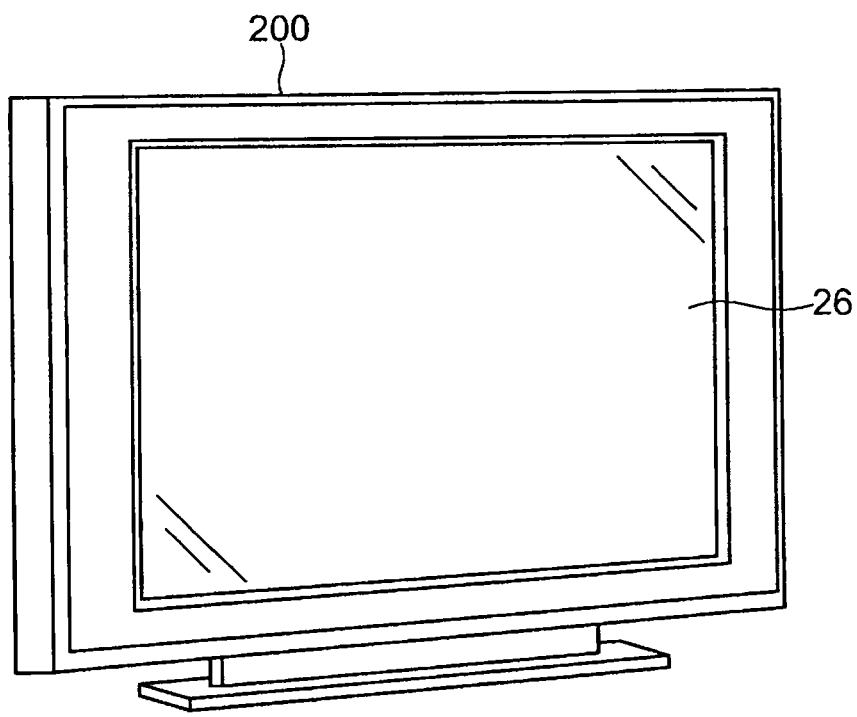
FIG. 1 is a schematic diagram illustrating a system configuration in accordance with an embodiment of the present technology.
Figure 1:
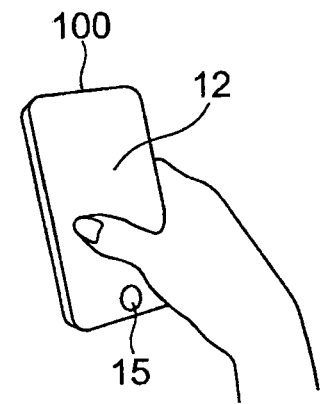

Hereinafter, embodiments of the present technology will be described with reference to the drawings.
[System Overview]
FIG. 1 is a schematic diagram illustrating a voice input system configuration in accordance with an embodiment of the present technology.

Figure 2:
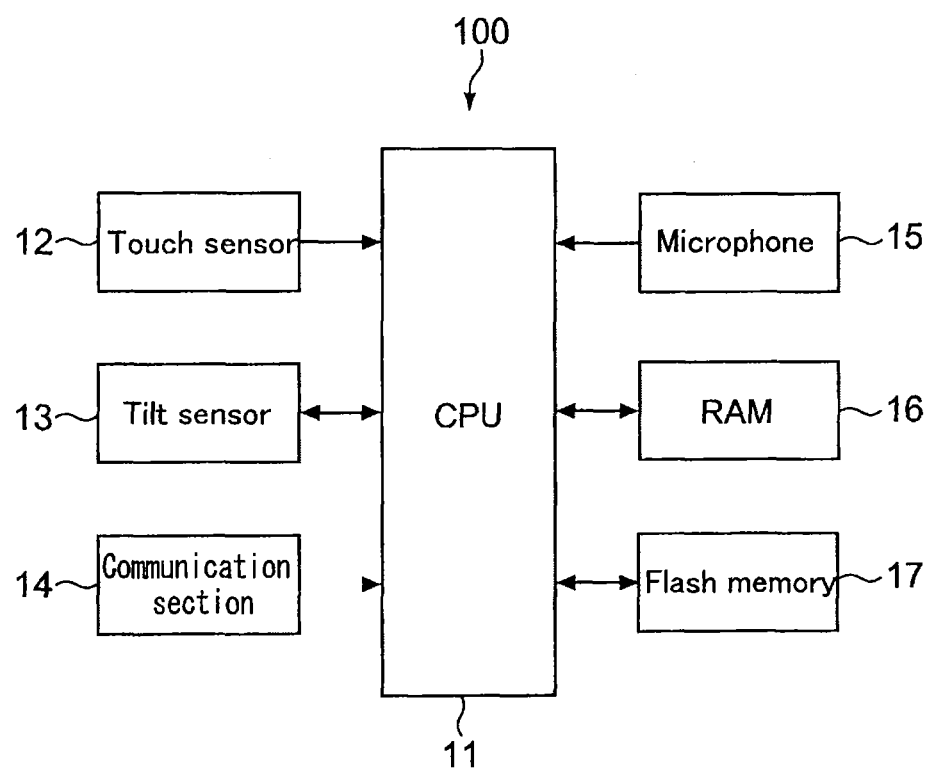
FIG. 2 is a block diagram of a hardware configuration of a remote controller used in the above-mentioned system.

As shown in FIG. 1, the present system includes a remote commander 100 (hereinafter, called a remote controller 100) and a television (TV) 200. The remote controller 100 described later converts voice of a user into a voice signal so as to allow execution of a voice input mode in which the voice signal is recognized as character information. In the voice input mode, there are produced on a display 26 of the TV 200 a plurality of images including an image (an icon) indicating that the voice input mode is in a state of being prepared and an image (an icon) indicating that the voice input mode is in ready condition.
[Hardware Configuration of Portable Terminal]
FIG. 2 is a block diagram of a hardware configuration of the above-mentioned remote controller 100. As shown in FIG. 2, the remote controller 100 has a central processing unit (CPU) 11, a touch sensor (a touch pad) 12, a tilt sensor 13, a communication section 14 responsible for providing communications, a microphone 15, a random access memory (RAM) 16, and a flash memory 17.

The CPU 11 controls every component part of the remote controller 100 entirely and performs various operations on the basis of various programs. As an example of such operations, the CPU 11 performs the above-mentioned voice input mode in which it converts the voice of a user input from the microphone 15 into a voice signal.

The touch sensor 12 covers, for example, the entire surface of the remote controller 100 or the entire front and back of the remote controller 100 and it detects the presence and location of touch of the user.

The tilt sensor 13 uses, for example, one of an accelerometer, an angular velocity sensor (a gyroscope), and a mechanical inclinometer to detect a tilt of the remote controller 100. When the tilt sensor 13 uses an accelerometer, the accelerometer may have 2 axes or 3 axes although the accelerometer with one axis can detect an angle of a tilt.

The communication section 14 transmits a command generated by the CPU 11 to the TV 200 by infrared rays or radio waves. The communication section 14 may be configured to provide communications with equipment on the network except the TV 200.

The microphone 15 has an analog-digital converter or the like to convert voice from its mouthpiece input by the user into a digital voice signal and outputs the digital voice signal to the CPU 11.

The RAM 16 is a volatile memory used as working area of the CPU 11 and temporarily stores various types of data and various programs used for processing by the CPU 11.

Figure 3:
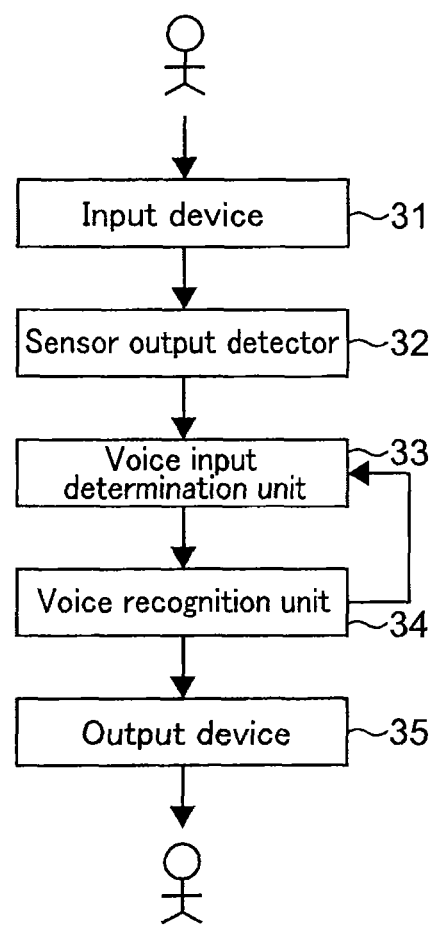
FIG. 3 is a block diagram of hardware of a TV used in the above-mentioned system.

The flash memory 17 is a nonvolatile memory to store various types of data and various programs necessary for processing by the CPU 11.
[Software Configuration of System]
FIG. 3 is a block diagram illustrating the configuration of facilities (software) provided by the system (including the remote controller 100 and TV 200).

As shown in FIG. 3, the system according to the present embodiment includes an input device 31, a sensor output detector 32, a voice input determination unit 33, a voice recognition unit 34, and an output device 35.

The input device 31, whose role is played by the touch sensor 12, receives inputs as touch operations by a user.

The sensor output detector 32, whose role is played by the tilt sensor 13, detects a tilt (angle) of the remote controller 100.

The voice input determination unit 33 determines whether the voice input mode is turned on or off (can be executed or not) when the user inputs voice via the microphone 15.

The voice recognition unit 34, whose role is played by, for example, the CPU 11, performs processing to recognize the input contents as a character string (voice recognition processing) in the voice input mode. The CPU 11 itself may perform the voice recognition processing or may make the TV 200 to perform the processing after transmitting the input voice signal to the TV 200. In addition, any particular server on the network connected to the remote controller 100 or TV 200 may perform the voice recognition processing.

The output device 35, whose role is played by the display screen of the TV 200, displays various kinds of graphical user interface (GUI) before and during the voice input mode.

Application software that may actually run during the voice input mode includes, for example, voice search application software using a search engine on the network, voice command, and internet telephone service by peer-to-peer (P2P) network. But it is not restricted to these examples.

[Operation of System]

Next, it is explained how the remote controller 100 and the TV 200 work in the voice input system as configured above. In the subsequent explanation, the CPU 11 of the remote controller 100 is mainly used as the agent, but it cooperates with the other hardware and software of the remote controller 100 to perform the agent's action.

(Change to Voice Input Mode)

Figure 4:
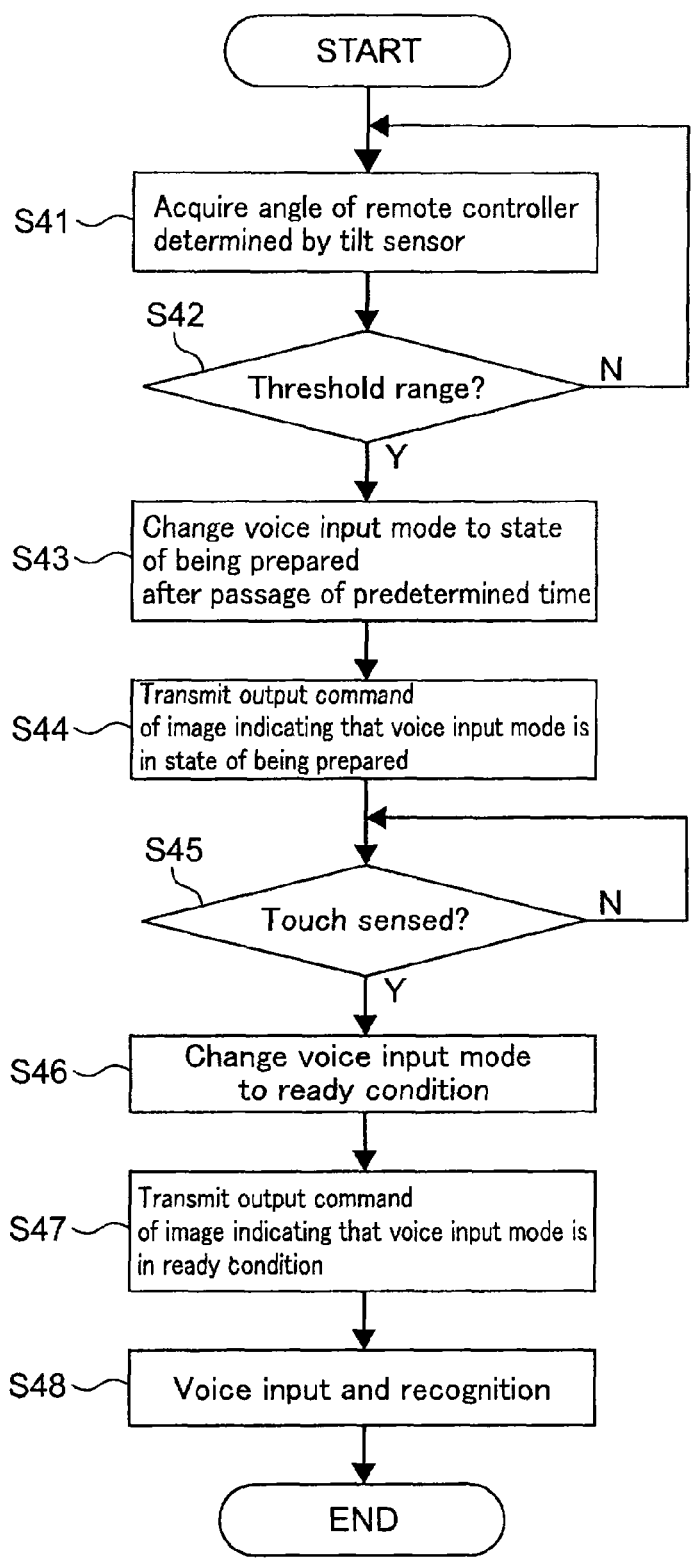
FIG. 4 is a flowchart illustrating a flow of operation until the remote controller completes shift to a voice input mode.

FIG. 4 is a flowchart illustrating a flow of operation until the remote controller 100 according to this embodiment completes shift to a voice input mode.

First of all, as shown in FIG. 4, the CPU 11 acquires the angle of the remote controller 100 detected by the tilt sensor 13 (step 41). In the drawings, step is abbreviated as "S."

Then, the CPU 11 determines whether or not the detected tilting angle falls in a predetermined threshold range (step 42). In other words, the CPU 11 detects whether or not the remote controller 100 is in an upright position state (in a state that the remote controller 100 has its principal plane extending in a vertical direction). Assuming that when the horizontal plane has 0 degree, the threshold range is, for example, a range from about 60 degrees to about 90 degrees of a tilting angle of the principal plane of the remote controller 100 to the horizontal plane, but it is not limited to this example.

Then, the CPU 11 changes the voice input mode to a state of being prepared after the passage of a predetermined period of time (about 1 second, for example) (step 43). Here, the CPU 11 waits for the passage of the predetermined period of time in order to prevent the tilt sensor 13 from chattering.

Then, the CPU 11 generates a command to present an icon (the first icon), which indicates that the voice input mode is in the state of being prepared, on a display screen 26 of the TV 200 and transmits it to the TV 200 (step 44). When the TV 200 receives the command, the TV 200 displays the first icon on the display screen 26.

Then, the CPU 11 determines whether or not the user's touch is detected by the touch sensor 12 (step 45). At this time, the touch sensor 12 has an assigned function serving only as an ON/OFF button, without functioning as a normal pointing device. Therefore, even if the touch sensor 12 has, for example, a plurality of touch areas which are assigned different functions, the touch sensor 12 has all of such functions disabled when the voice input mode is in the state of being prepared or in the state of being in ready condition.

When determining that the touch is detected (Yes), the CPU 11 changes the voice input mode to ready condition (step 46). With this change, the CPU 11 generates a command to present an icon (the second icon), which indicates that the voice input mode is in the state of being in ready condition, on the display screen 26 of the TV 200 and transmits it to the TV 200 (step 47). When the TV 200 receives this command, the TV 200 presents the second icon on the display screen 26.

Then, the CPU 11 performs voice input and recognition processing (voice input mode) responsive to an input voice from the user while the touch is being detected (step 48). At this moment, the voice input and voice recognition state is indicated by an icon (the third icon) presented on the display screen 26 of the TV 200.

FIGS. 5A to 5C, FIGS. 6A to 6C, FIGS. 7A to 7C, and FIGS. 8A to 8C are schematic diagrams illustrating examples of the first icon, the second icon, and the third icon. In each set of the figures, FIG. 5A, 6A, 7A, or 8A shows the first icon, FIG. 5B, 6B, 7B, or 8B shows the second icon, and FIG. 5C, 6C, 7C, or 8C shows the third icon with a change from the first to second icon and then from the second to third icon in accordance with a change of the state of the voice input mode.

In the example shown in FIGS. 5A to 5C, a change in color of icon shows a difference in state of the voice input mode. In other words, when the remote controller 100 is in an upright position state, an icon with a shape imitating a microphone appears on the display screen 26 as the first icon. At the time, the icon is displayed in a predetermined color such as gray. When the user's touch is detected subsequently, the microphone type icon with its color having changed (to green, for example) is displayed as the second icon. When the user's voice is input from the microphone 15 later, the microphone type icon with its color having changed again (to yellow, for example) is shown as the third icon.

In the example shown in FIGS. 6A to 6C, a change in size of icon shows a difference in state of the voice input mode. In other words, a microphone type icon with a relatively small size is presented as the first icon, and the microphone type icon with its size about twice as large as the first icon is presented as the second icon when the user's touch is detected. Then, the microphone type icon with its size corresponding to the actual loudness of the user's voice is presented as the third icon. For example, when the user's voice is relatively quiet, the third icon is smaller in size than the second icon, and when the user's voice is relatively loud, the third icon is larger in size than the second icon.

In the example shown in FIGS. 7A to 7C, a change in depth of a color of icon shows a difference in state of the voice input mode. In other words, a microphone type icon in a translucent state is presented as the first icon, and the microphone type icon in an opaque state is presented as the second icon when the user's touch is detected. Then, the microphone type icon in deeper state is displayed as the third icon when the user's voice is input.

In the example shown in FIGS. 8A to 8C, a change in shape of icon shows a difference in state of the voice input mode. In other words, an icon with a shape imitating the remote controller 100 is displayed as the first icon, and a microphone type icon given after a change from the icon imitating the remote controller 100 is displayed as the second icon when the user's touch is detected. For example, the microphone type icon with wavelike animation thereabove is presented as the third icon when there is an input voice from the user. The wavelike animation is presented with its ripples spreading outwardly from its center. The wavelike animation may serve as an indicator with the ripples varying in number to reflect the loudness of the user's voice.

(Exit From Voice Input Mode)

Figure 9:
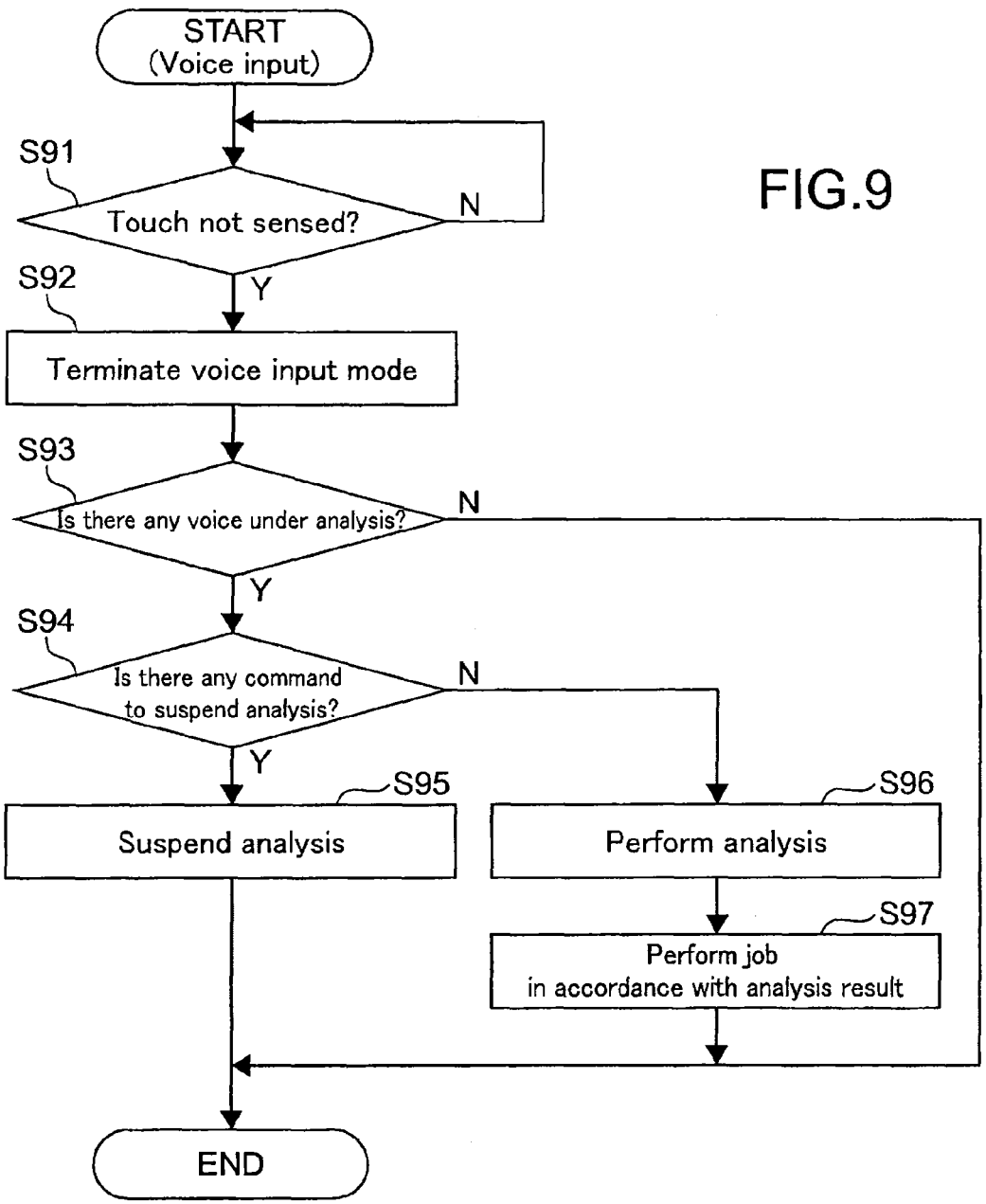
FIG. 9 is a flowchart illustrating a flow of operation in the remote controller upon exiting from voice input mode.

FIG. 9 is a flowchart illustrating a flow of operation in the remote controller 100 upon exiting from the voice input mode.

First, as shown in FIG. 9, the CPU 11 determines whether the user's touch is not detected (step 91), and when determining that the user's touch is not detected (Yes), the CPU 11 exits from or terminates the voice input mode (step 92). In addition, the CPU 11 may exit from the voice input mode when determining that the angle of the remote controller 100 falls outside the predetermined angular range after the user's touch ceases to be detected.

Here, the CPU 11 determines whether or not there is any voice input by the user under analysis (under recognition) (step 93). When determining that there is no voice under analysis (No), the CPU 11 terminates the processing.

When determining that there is voice under analysis (Yes), the CPU 11 determines whether or not there is any input command to suspend analysis processing (step 94). What may be considered as such command is, for example, a flick input operation by the user on the touch sensor 12 in a predetermined direction (for example, to the left-hand side), a shaking operation by the user to shake the remote controller 100 horizontally or vertically, or an input by the user of a predetermined kind of voice (for example, "suspend", "stop", and any other order to suspend the voice input mode). That is, the command brings about some change in state of the remote controller 100. In this case, the remote controller 100 is changed to a special mode for receiving an analysis processing suspension.

When determining that there is an input of the command to suspend analysis processing (Yes), the CPU 11 suspends the analysis processing (step 95) and terminates the processing.

When, on the other hand, determining that there is no input of the command to suspend analysis processing (No), the CPU 11 keeps on carrying out analysis processing of the voice (step 96) and executes job in accordance with the analysis result (step 97).

(AND Search Processing)

Figure 10:
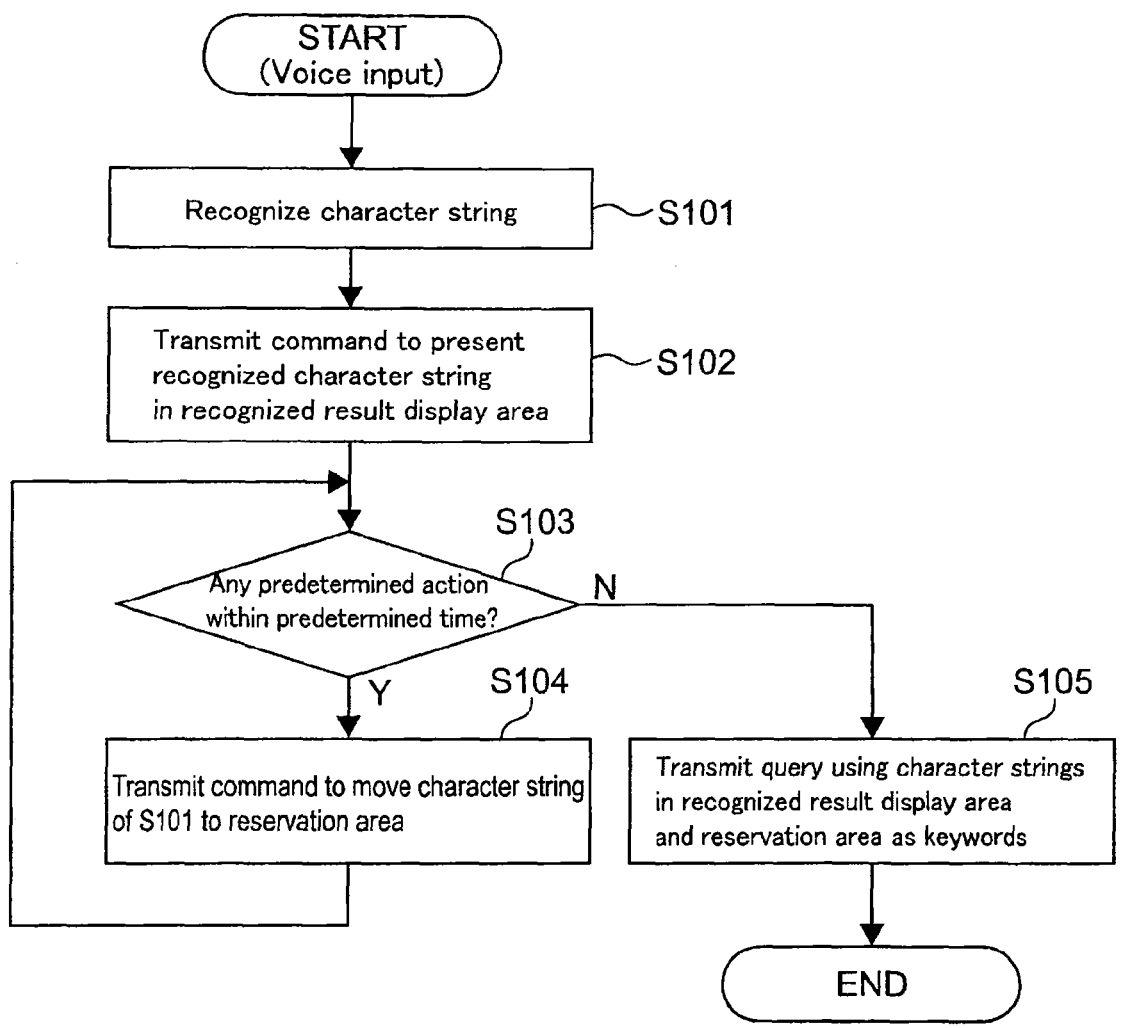
FIG. 10 is a flowchart illustrating a flow of AND search processing under voice search processing executed by voice input mode.

As described before, there is a voice search as one of applications which may be performed in the voice input mode. FIG. 10 is a flowchart illustrating a flow of AND search processing under the voice search processing executed by the voice input mode.

As shown in FIG. 10, the CPU 11 first recognizes a character string indicated by the voice that is input by the user, by the voice recognition processing described above (step 101).

Following the above, the CPU 11 transmits to the TV 200 a command to present the recognized character string in a recognized result display area (step 102).

Figure 11:
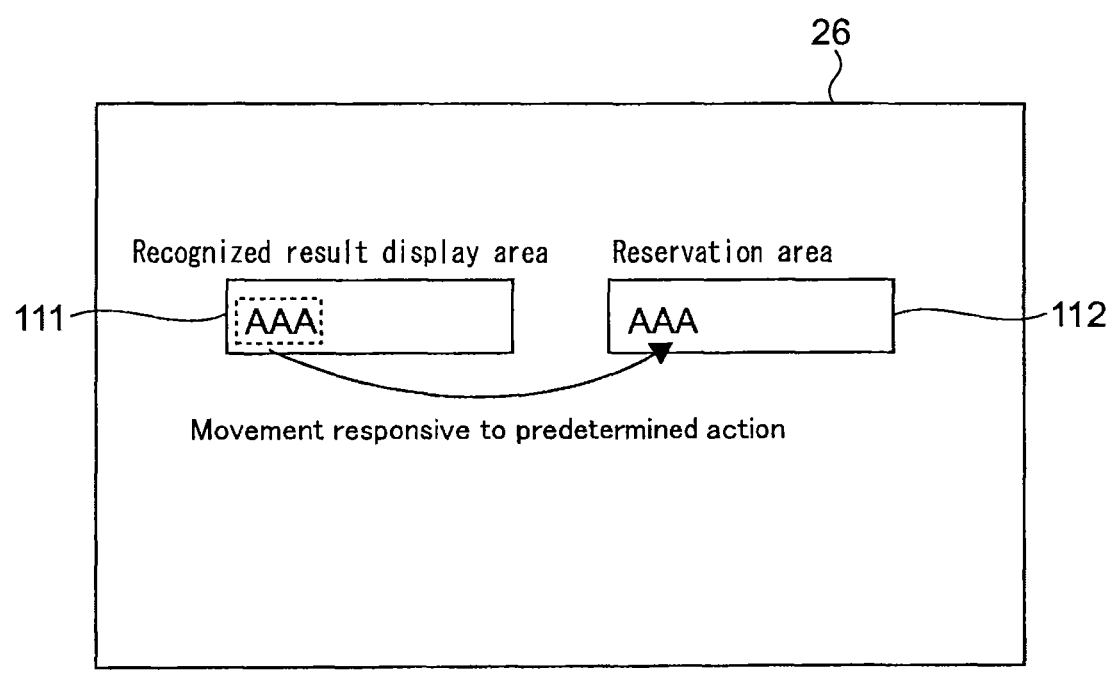
FIG. 11 is a block diagram illustrating one example of a user interface that is displayed under the AND search processing.

FIG. 11 is a block diagram illustrating one example of a user interface that is displayed under the AND search processing. As shown in FIG. 11, the recognized character string is presented in the recognized result display area 111 of the user interface under the AND search processing on the display screen 26 of the TV 200 when the TV 200 receives the command.

Following the above, the CPU 11 determines whether or not a predetermined action by the user is detected within a predetermined period of time (step 103). What may be considered here as the predetermined action is the user's operation to shake the remote controller 100, the user's flick input operation to the right on the touch sensor 12, or any other action by the user on the remote controller 100 with the same intention as the user shake the remote controller 100 as mentioned above. But, the predetermined action is not limited to these examples.

When determining that the predetermined action is not detected within the predetermined period of time (No), the CPU 11 transmits to a search engine on a network a query using, as a search keyword, the character string within the recognized result display area 111 (step 105). The query may be transmitted from the remote controller 100 to the associated search engine via the TV 200, or it may be transmitted directly without passing the TV 200.

When, on the other hand, determining that the predetermined action is detected within the predetermined period of time (Yes), the CPU 11 transmits to the TV 200 a command to move the recognized character string presented in the recognized result display area 111 to a reservation area (step 104).

As shown in FIG. 11, the character string that is presented in the recognized result display area 111 of the display screen 26 moves to the reservation area 112 that is provided on the right-hand side of the recognized result display area 111 and it is presented in the reservation area 112 because the TV 200 receives the above-mentioned command. When determining that the user's action (a left-click, for example) that is different from (in contrast to) the predetermined action is detected, the CPU 11 may cancel (delete) the input of the character string presented in the recognized result display area 111.

Then, the CPU 11 waits for the predetermined period of time to determine whether or not the predetermined action occurs, and when determining that there is no such action, the CPU 11 transmits to the search engine a query for AND search by using the character string displayed in the recognized result display area 111 and the character string displayed in the reservation area 112 as key words (step 105). Result of search received from the search engine is presented on the display screen 26.

In this way, the remote controller 100 causes the recognized result display area ill and the reservation area 112 to present character strings based on the user's action, making it easy for the user to perform AND search processing in the voice input mode.

[Conclusions]

According to the present embodiment, the remote controller 100 makes it possible to display an icon indicating that the voice input mode is in a state being prepared (a first icon) and an icon indicating that the voice input mode is in ready condition (a second icon) based on a predetermined change in state of the remote controller 100 as explained above. Therefore, the remote controller 100 causes the user to easily grasp the state of the voice input mode and a change of the state of the voice input mode.

[Modifications]

The present technology is not limited only to the embodiments described above, and it is understood that various modifications may be made without departing from the gist of the present disclosure.

(Visual Feedback of Loudness)

In the embodiments described above, the user may be visually informed of whether the user's voice to be input is too loud or too quiet as compared to the appropriate loudness to voice recognition. Hereinafter, this processing is explained in detail.

Figure 12C:
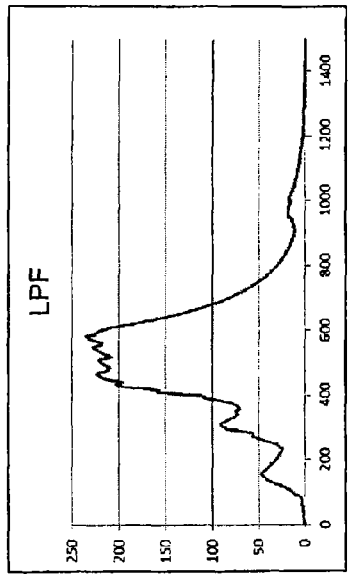
FIGS. 12A to 12C and 12C' illustrate processing, in the voice input mode, for informing the user of loudness of voice input by means of graphical representations.
Figure 12C:
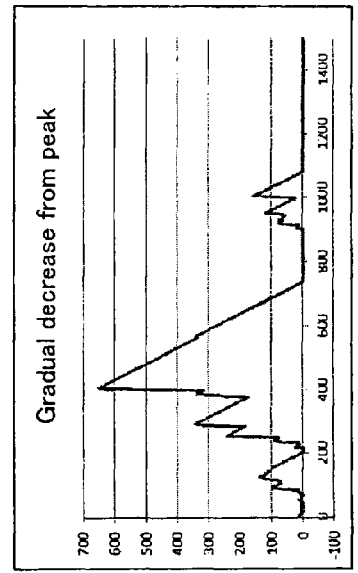
Figure 12A:
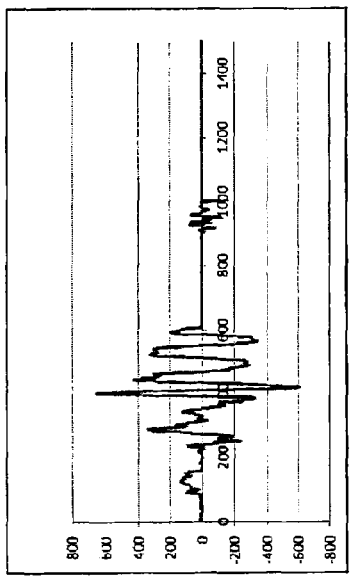
Figure 12B:
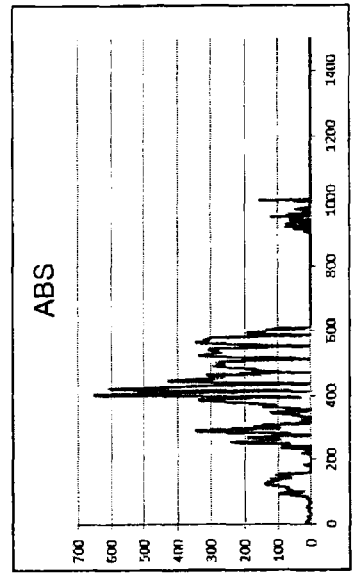

FIGS. 12A to 12C and 12C' illustrate processing for informing the user of loudness by means of graphical representations.

For graphical representation of loudness, processing of the voice, for example, in the following manner is more desirable than animation that represents changes in voice on real time basis (with good tracking), because the voice changes every moment.

First of all, using absolute value processing (processing using function ABS), the CPU 11 converts the waveform shown in FIG. 12A of the original voice signal that is given by converting the user's voice, into positive scalar shown in FIG. 12B. Here, using squaring processing in place of the absolute value processing, the voice signal may be converted into positive scalar.

Further, the CPU 11 performs processing to smooth the voice signal after the absolute value processing.

It may be seen to use a low pass filer for signal smoothing as shown in FIG. 12C. It may be conceivable to perform signal smoothing such that there is a gradual decrease in value from its peak value as shown in FIG. 12C' by, if the current value of voice level is greater than the previous value of voice level, setting that value as the current value and if the current value is less than the previous value at a certain time point, setting the value obtained by subtracting a predetermined value from the current value of voice level as the current value of voice level.

With the graphical representation shown in FIG. 12C or 12C' displayed on the display screen 26 of the TV 200, the CPU 11 allows the user to adjust the loudness of voice after knowing that his/her own voice is too loud or too quiet.

The CPU 11 may display the loudness of voice with an icon. FIGS. 13A and 13B and FIGS. 14A to 14C illustrate examples of display for informing the user of loudness of voice by means of an icon.

As shown in FIG. 13A, the CPU 11 transmits to the TV 200 a command to present an icon obtained by extracting a portion of an enlarged version of the microphone type icon as shown in FIGS. 5A to 8C when the user's voice is too loud (the input level of the voice to the microphone 15 is greater than a predetermined first threshold). This makes the user understand that his/her own voice is too loud because the displayed microphone icon is so large that the whole is not visible.

On the other hand, as shown in FIG. 13B, the CPU 11 transmits to the TV 200 a command to present an icon obtained by reducing in size the microphone type icon when the user's voice is too quiet (the input level of the voice to the microphone 15 is less than or equal to a predetermined second threshold that is less than the first threshold). In place of what is previously described, the CPU 11 may cause display of an icon derived from a translucent microphone type icon or a microphone type icon with a light color. This makes the user understand that his/her own voice is too quiet because of a reduction in size of the microphone type icon.

In addition, as shown in FIGS. 14A to 14C, the CPU 11 may inform the user of the loudness by highlighting one of portions of ripples displayed above the microphone type icon.

Specifically, the CPU 11 transmits to the TV 200 a command to present a microphone type icon with its outermost ripple highlighted when the input level of voice to the microphone 15 is greater than the first threshold. Checking this display out makes the user understand that his/her own voice is too loud.

In addition, the CPU 11 transmits to the TV 200 a command to present a microphone type icon with its innermost ripple highlighted when the input level of voice to the microphone 15 is less than or equal to the second threshold. Checking this display out makes the user understand that his/her own voice is too quiet.

On the other hand, the CPU 11 transmits to the TV 200 a command to present a microphone type icon with its intermediate ripple highlighted when the input level of voice to the microphone 15 is greater than the second threshold but less or equal to the first threshold. Checking this display out makes the user understand that his/her own voice has proper loudness.

(Removal of TV Sound)

In the embodiments described above, the input state of voice is displayed on the display screen 26 of the TV 200 while the voice input mode is being performed. If, now, some sound is output from the TV 200, the microphone 15 picks up the TV sound in addition to the user's voice, so that the possibility that recognition accuracy might fall could be considered. Then, the TV 200 may have the function of removing the TV sound in the voice input mode.

Figure 15:
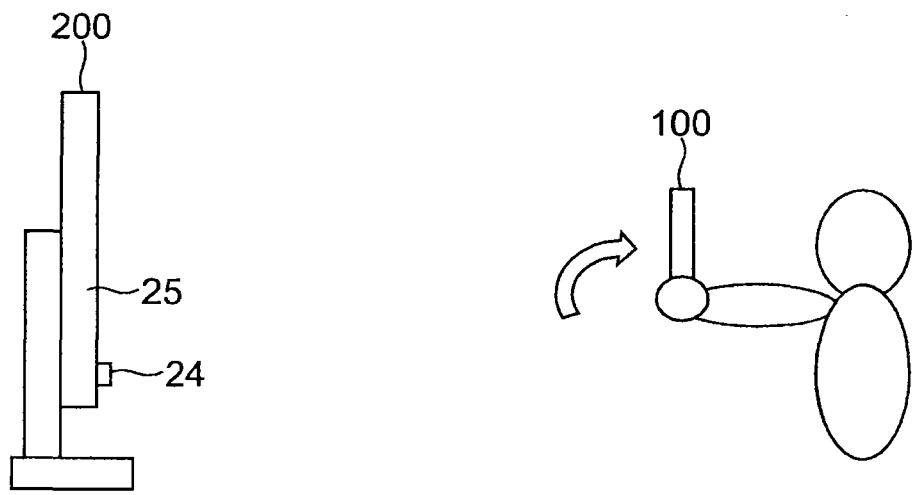
FIG. 15 is a schematic diagram illustrating how to remove a TV sound in the voice input mode.
Figure 16:
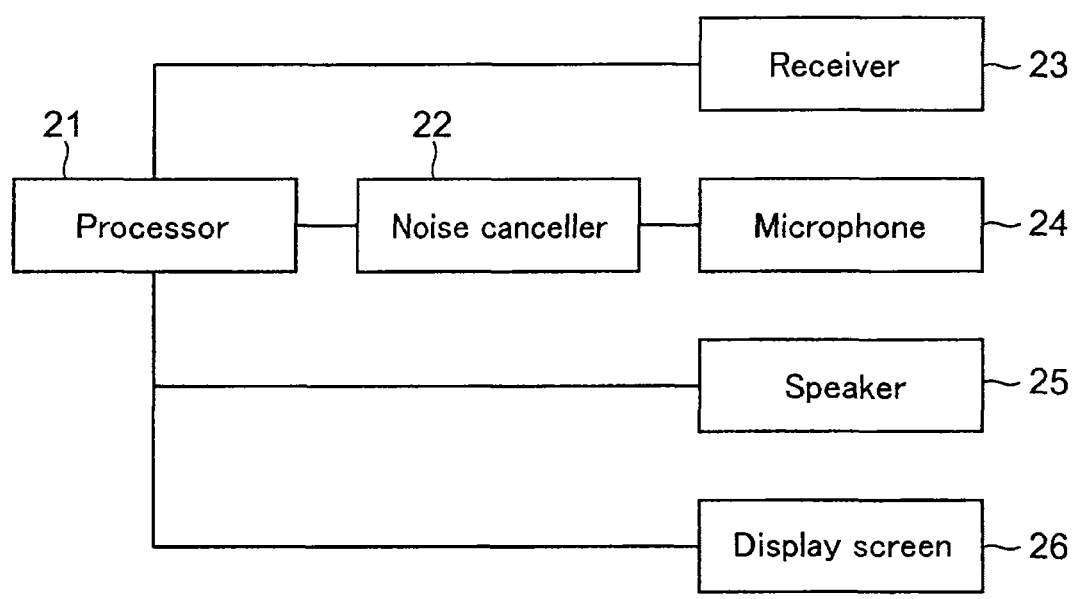
FIG. 16 is a block diagram of the TV configured to perform processing to remove the TV sound in the voice input mode.

FIG. 15 is a schematic diagram illustrating how to remove the TV sound in the voice input mode, and FIG. 16 is a block diagram of the TV 200 configured to perform processing to remove the TV sound in the voice input mode.

As shown in FIG. 16, the TV 200 includes, in addition to the display screen 26, a processor 21, a noise canceller 22, a receiver 23, a microphone 24, and a speaker 25.

The processor 21 controls every block of the TV 200 entirely. The noise canceller 22 removes the sound input to the microphone 24 when a predetermined condition is met. The receiver 23 receives the various commands from the remote controller 100 and values from the various sensors. The speaker 25 outputs the voice generated by the processor 21.

The CPU 11 of the remote controller 100 transmits to the TV 200 a command to turn on the microphone 24 of the TV 200 when the CPU 11 detects that the user has held the remote controller 100 in the upright position (after predetermined angular movement) using the output of the tilt sensor 13 or the like.

The processor 21 of the TV 200, on the other hand, turns on the microphone 24 and starts the noise canceller 22 when the TV 200 receives the above-mentioned command.

Then, the processor 21 causes the noise canceller 22 to remove as noise the sound that is output from the speaker 25 to the microphone 24. Therefore, it may be said that the command that is transmitted from the remote controller 100 to the TV 200 is a command to turn on the microphone 24, while it is a command to turn down the volume of the sound output by the TV 200.

This removes ill-effect on the voice recognition processing in the remote controller 100 because all of the sound from the speaker 25 of the TV 200 is removed in the noise input mode.

(Other Modifications)

In the embodiments described above, the remote controller 100 uses the output of the tilt sensor 13 to change the state of the voice input mode to a state of being prepared. However, the remote controller 100 may include, in place of the tilt sensor 13, a distance sensor (an infrared sensor) to detect a distance from the remote controller 100 to the user's mouth to change the state of the voice input mode to the state of being prepared when the detected distance becomes less than or equal to a predetermined value (about 3 cm to about 10 cm, for example).

Similarly, the remote controller 100 may include, in place of the tilt sensor 13, a camera to shoot the user's mouth to change the state of the voice input mode to the state of being prepared when the user's mouth shot is greater than a predetermined size.

In other words, with a state detection section to detect some change in the state of the remote controller 100, the remote controller 100 can change the voice input mode to the state of being prepared.

Further, with the TV 200 having a camera to shoot the user and the state of the remote controller 100, the remote controller 100 may perform robust detection of the remote controller 100 held in its upright position using both the detected value of the tilt sensor 13 and the picture shot by the camera.

In the previously described embodiments, the detected values of the tile sensor 13 and the presence or absence of detection by the touch sensor 12 are used to change the voice input mode. However, using hardware buttons and GUI icons in place of such sensors, the user may actively change the voice input mode.

In the previously described embodiments, the remote controller 100 changes the voice input mode to the state of being prepared when the tilt sensor 13 detects that the remote controller 100 is held in the upright position. It can be considered, however, the fingers of both hands of the user are used to hold the remote controller 100 in its upright position when, for example, the user uses the remote controller 100 as a game controller. Therefore, the remote controller 100 may perform control so as not to change the voice input mode to the state of being prepared even when the detected value of the tilt sensor 13 falls in the threshold range under circumstances where touches on a plurality of points of the touch sensor 12 are detected (multi-touches are detected).

In the previously described embodiments, the processor 21 of the TV 200 may bear at least a portion of various kinds of processing performed by the CPU 11 of the remote controller 100. For example, with regard to processing to determine whether or not the detected value of the tilt sensor 13 falls in the predetermined threshold range (step 42 in FIG. 4), processing to change the voice input mode to the state of being prepared after passage of the predetermined period of time (step 43 in FIG. 4), processing to change the voice input mode to the ready condition based on detection by the touch sensor 12 (step 46 in FIG. 4), and any other processing closely associated with the voice input mode, the remote control sensor 100 transmits to the TV 200 only output of every sensor and the processor 21 may perform the actual processing.

In the previously described embodiments, the remote controller 100, which is configured as shown in FIG. 2, is shown as an information processing apparatus to execute the voice input mode. However, any one of all available other portable information processing apparatuses including mobile phones, smartphones, portable audio players, and handheld game consoles may be used in place of the remote controller 100. In the previously described embodiments, the TV 200 is shown as an apparatus that provides visual feedback to the user when the voice input mode is being performed, but any one of all available information processing apparatuses including personal computers (PCs), personal video recorders (PVRs), and game machines may be used in place of the TV 200.

In the previously described embodiments, there is described an example in which the information processing apparatus (remote controller 100) that performs the voice input mode and the information processing apparatus (TV 200) that provides a visual feedback of the change state of the voice input mode when the voice input mode is being performed are separate. However, one information processing apparatus is permitted in place of the two information processing apparatuses to perform the voice input mode and to provide a visual feedback of the change state of the voice input mode. In other words, if the remote controller 100 has a display, the visual feedback of the second or third stage may be presented on the display when the voice input mode is being performed. In this case, the CPU 11 of the remote controller 100 generates various commands to present the first to third icons and cause its own display to present these icons.

[More Description]

The present technology is contemplated to encompass information processing apparatuses as follows.

(1) An apparatus including:
  an input unit configured to receive a first type input and a second type input;
  a microphone configured to receive an input sound signal;
  a control unit configured to control a display to display feedback according to a type of input; and
  a voice recognition unit configured to perform recognition processing on the input sound signal.
(2) The apparatus according to (1), wherein the control unit controls the display to display feedback based on the first type input being a touch input from a user.
(3) The apparatus according to (2), wherein the control unit controls the display to display an indication of an input mode based on the first type input from the user.
(4) The apparatus according to (3), wherein the control unit controls the display to display the indication of the input mode by changing a color of an icon.
(5) The apparatus according to (3), wherein the control unit controls the display to display the indication of the input mode by changing a size of an icon.
(6) The apparatus according to (3), wherein the control unit controls the display to display the indication of the input mode by changing an opacity of an icon.
(7) The apparatus according to (3), wherein the control unit controls the display to display the indication of the input mode by changing a shape of an icon.
(8) The apparatus according to (3), further comprising:
  a tilt sensor configured to determine a tilt angle of the apparatus.
(9) The apparatus according to (8), wherein the control unit changes the input mode from a first mode to a second mode based on the second type input being the tilt angle detected by the tilt sensor.
(10) The apparatus according to (9), wherein the control unit changed the input mode from the second mode to a third mode based on the first type input.
(11) The apparatus according to (10), wherein the voice recognition unit performs recognition processing on the input sound signal after the input mode is changed from the second mode to the third mode.
(12) The apparatus according to (11), wherein the control unit controls the display to display text recognized by the voice recognition unit in a first area on the display.
(13) The apparatus according to (12), wherein the control unit controls the display to move the text in the first area to a second area when an action by the user is detected within a predetermined time period.
(14) The apparatus according to (13), wherein the control unit performs a search query on text in the first area and the second area if the action by the user is not detected within the predetermined time period.
(15) The apparatus according to (1) to (14), wherein the control unit controls the display to display feedback based on the input sound signal from the user.
(16) The apparatus according to (15), wherein the control unit controls the display to display an indication that the input sound signal is one of too loud, too quiet, and appropriate.
(17) The apparatus according to (16), wherein the control unit controls the display to display the indication that the input sound signal is one of too loud, too quiet, and appropriate by changing a shape of an icon.

(16) The apparatus according to (16), wherein the control unit controls the display to display the indication that the input sound signal is one of too loud, too quiet, and appropriate by changing a highlighted portion of an icon.

(19) A method including:
receive a first type input and a second type input;
receiving an input sound signal;
controlling a display to display feedback according to a type of input; and
performing recognition processing on the input sound signal.

(20) A non-transitory computer readable medium encoded with a program that, when loaded on a processor, causes the processor to perform a method including:
receive a first type input and a second type input;
receiving an input sound signal;
controlling a display to display feedback according to a type of input; and
performing recognition processing on the input sound signal.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
a tilt sensor configured to determine a tilt angle of the apparatus, and
circuitry configured to:
receive a first type input and a second type input;
receive an input sound signal;
control a display to display feedback according to a type of input;
perform recognition processing on the input sound signal;
control the display to display the feedback based on the first type input being a touch input and the second type input being a tilting input from a user;
change an input mode from a first mode to a second mode based on the second type input being the tilt angle detected by the tilt sensor; and
change the input mode from the second mode to a third mode based on the first type input, wherein
the second mode and the third mode are each a different state of a voice input mode associated with a third type input,
the second mode is one where the voice input mode is in a state of being prepared,
the third mode is one where the voice input mode is in a state of readiness,
the feedback based on the first type input being the touch input is feedback corresponding to the third mode, and
the feedback based on the second type input being the tilting input from the user is feedback corresponding to the second mode.

2. The apparatus according to claim 1, wherein the circuitry is configured to perform recognition processing on the input sound signal as the third type input after the input mode is changed from the second mode to the third mode.

3. The apparatus according to claim 2, wherein the circuitry is configured to control the display to display text recognized by the voice recognition unit in a first area on the display.

4. The apparatus according to claim 3, wherein the circuitry is configured to control the display to move the text in the first area to a second area when an action by the user is detected within a predetermined time period.

5. The apparatus according to claim 4, wherein the circuitry is configured to perform a search query on text in the first area and the second area if the action by the user is not detected within the predetermined time period.

6. The apparatus according to claim 1, wherein the circuitry is configured to control the display to display the feedback based on the input sound signal from the user.

7. The apparatus according to claim 6, wherein the circuitry is configured to control the display to display an indication that the input sound signal is one of too loud, too quiet, and appropriate.

8. The apparatus according to claim 7, wherein the circuitry is configured to control the display to display the indication that the input sound signal is one of too loud, too quiet, and appropriate by changing a shape of an icon.

9. The apparatus according to claim 7, wherein the circuitry is configured to control the display to display the indication that the input sound signal is one of too loud, too quiet, and appropriate by changing a highlighted portion of an icon.

10. The apparatus according to claim 1, wherein the input sound signal is a voice input as the third type input.

11. The apparatus according to claim 1, wherein the circuitry is configured to display the feedback as an indication of the input mode.

12. The apparatus according to claim 11, wherein the circuitry is configured to control the display to display the indication of the input mode by changing a color of an icon.

13. The apparatus according to claim 11, wherein the circuitry is configured to control the display to display the indication of the input mode by changing a size of an icon.

14. The apparatus according to claim 11, wherein the circuitry is configured to control the display to display the indication of the input mode by changing an opacity of an icon.

15. The apparatus according to claim 11, wherein the circuitry is configured to control the display to display the indication of the input mode by changing a shape of an icon.

16. A method comprising:
receiving a first type input and a second type input;
receiving an input sound signal;
controlling a display to display feedback according to a type of input;
performing recognition processing on the input sound signal;
controlling the display to display the feedback based on the first type input being a touch input and the second type input being a tilting input from a user;
changing an input mode from a first mode to a second mode based on the second type input being the tilt angle detected by a tilt sensor; and
changing the input mode from the second mode to a third mode based on the first type input, wherein
the second mode and the third mode are each a different state of a voice input mode associated with a third type input,
the second mode is one where the voice input mode is in a state of being prepared,
the third mode is one where the voice input mode is in a state of readiness,
the feedback based on the first type input being the touch input is feedback corresponding to the third mode, and
the feedback based on the second type input being the tilting input from the user is feedback corresponding to the second mode.

17. A non-transitory computer readable medium encoded with a program that, when loaded on a processor, causes the processor to perform a method comprising:

receiving a first type input and a second type input;
receiving an input sound signal;
controlling a display to display feedback according to a type of input;
performing recognition processing on the input sound signal;
controlling the display to display the feedback based on the first type input being a touch input and the second type input being a tilting input from a user;
changing an input mode from a first mode to a second mode based on the second type input being the tilt angle detected by a tilt sensor; and
changing the input mode from the second mode to a third mode based on the first type input, wherein
the second mode and the third mode are each a different state of a voice input mode associated with a third type input,
the second mode is one where the voice input mode is in a state of being prepared,
the third mode is one where the voice input mode is in a state of readiness,
the feedback based on the first type input being the touch input is feedback corresponding to the third mode, and
the feedback based on the second type input being the tilting input from the user is feedback corresponding to the second mode.

18. An apparatus comprising:
circuitry configured to:
  receive a first type input and a second type input;
  receive an input sound signal;
  control a display to display feedback according to a type of input;
  perform recognition processing on the input sound signal;
  control the display to display feedback based on receiving the first type input being a physical key input;
  control the display to display feedback based on receiving the second type input being a touch panel input;
  control the display to display text recognized by the recognition processing in a first area on the display; and
  control the display to move the text in the first area to a second area.

* * * * *